United States Patent
Guo et al.

(10) Patent No.: US 10,860,841 B2
(45) Date of Patent: Dec. 8, 2020

(54) FACIAL EXPRESSION IMAGE PROCESSING METHOD AND APPARATUS

(71) Applicant: SAMSUNG ELECTRONICS CO., LTD., Suwon-si (KR)

(72) Inventors: Tianchu Guo, Beijing (CN); Youngsung Kim, Suwon-si (KR); Hui Zhang, Beijing (CN); Byungin Yoo, Seoul (KR); Chang Kyu Choi, Seongnam-si (KR); Jae-Joon Han, Seoul (KR); Jingtao Xu, Beijing (CN); Deheng Qian, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 145 days.

(21) Appl. No.: 15/837,877

(22) Filed: Dec. 11, 2017

(65) Prior Publication Data
US 2018/0189553 A1 Jul. 5, 2018

(30) Foreign Application Priority Data

Dec. 29, 2016 (CN) .......................... 2016 1 1248661
Jul. 4, 2017 (KR) ........................ 10-2017-0084930

(51) Int. Cl.
*G06K 9/00* (2006.01)
*G06F 17/10* (2006.01)
(Continued)

(52) U.S. Cl.
CPC ......... *G06K 9/00302* (2013.01); *G06F 17/10* (2013.01); *G06K 9/00255* (2013.01);
(Continued)

(58) Field of Classification Search
CPC .......... G06K 9/00302; G06K 9/00255; G06K 9/00268; G06K 9/00281; G06K 9/6211; G06T 7/248; G06T 11/00; G06F 17/10
See application file for complete search history.

(56) References Cited

U.S. PATENT DOCUMENTS 6,600,830 B1 * 7/2003 Lin .................... G06K 9/00268
382/118
6,919,892 B1 * 7/2005 Cheiky .................. G06T 13/40
345/473
(Continued)

FOREIGN PATENT DOCUMENTS

JP 3951061 B2 8/2007
KR 10-0407111 B1 11/2003
(Continued)

OTHER PUBLICATIONS

Kattan et al. "Training Feed-Forward Neural Networks using a Parallel Genetic Algorithm with the Best Must Survive Strategy" (2010) International Conference on Intelligent Systems, Modelling and Simulation—pp. 1-4.*
(Continued)

*Primary Examiner* — Mia M Thomas
(74) *Attorney, Agent, or Firm* — NSIP Law

(57) ABSTRACT

A processor implemented method of processing a facial expression image, the method includes acquiring an expression feature of each of at least two reference facial expression images; generating a new expression feature based on an interpolation value of the expression feature; and adjusting a target facial expression image based on the new expression feature and creating a new facial expression image.

17 Claims, 13 Drawing Sheets

(51) Int. Cl.
*G06T 7/246* (2017.01)
*G06K 9/62* (2006.01)
*G06T 11/00* (2006.01)

(52) U.S. Cl.
CPC ..... *G06K 9/00268* (2013.01); *G06K 9/00281* (2013.01); *G06K 9/6211* (2013.01); *G06T 7/248* (2017.01); *G06T 11/00* (2013.01); *G06T 2207/30201* (2013.01)

(56) References Cited

U.S. PATENT DOCUMENTS

| | | | | |
|---|---|---|---|---|
| 7,027,054 | B1* | 4/2006 | Cheiky | G06T 13/40 345/473 |
| 8,902,232 | B2 | 12/2014 | Debevec et al. | |
| 9,036,018 | B2 | 5/2015 | Wang et al. | |
| 10,417,533 | B2* | 9/2019 | Barker | G06K 9/66 |
| 2005/0078124 | A1* | 4/2005 | Liu | G06T 13/40 345/629 |
| 2010/0007665 | A1* | 1/2010 | Smith | G06T 13/40 345/473 |
| 2010/0134487 | A1 | 6/2010 | Lai et al. | |
| 2013/0002669 | A1* | 1/2013 | Rhee | G06T 13/40 345/420 |
| 2013/0147788 | A1* | 6/2013 | Weise | G06T 13/40 345/419 |
| 2013/0215113 | A1* | 8/2013 | Corazza | G06T 13/40 345/420 |
| 2013/0243281 | A1* | 9/2013 | Nakamura | G06K 9/00362 382/128 |
| 2013/0300900 | A1* | 11/2013 | Pfister | G06K 9/00315 348/239 |
| 2014/0355843 | A1* | 12/2014 | Da | G06K 9/00214 382/118 |
| 2015/0242678 | A1* | 8/2015 | Lee | G06K 9/00302 382/118 |
| 2015/0262000 | A1* | 9/2015 | Huo | G06K 9/00718 382/199 |
| 2015/0269431 | A1* | 9/2015 | Haji | G06K 9/00879 382/186 |
| 2015/0302240 | A1* | 10/2015 | Rao | G06K 9/00248 382/201 |
| 2016/0011657 | A1* | 1/2016 | Estacio | G06F 3/013 345/156 |
| 2016/0127641 | A1* | 5/2016 | Gove | G06T 1/0007 348/143 |
| 2016/0275341 | A1* | 9/2016 | Li | G06T 13/40 |
| 2016/0314784 | A1* | 10/2016 | Kleppe | A61B 5/167 |
| 2017/0083757 | A1* | 3/2017 | Enomoto | G06F 3/011 |
| 2017/0116467 | A1* | 4/2017 | Li | G06T 13/40 |
| 2017/0116478 | A1* | 4/2017 | Gousev | G06K 9/6267 |
| 2017/0228867 | A1* | 8/2017 | Baruch | G06T 7/149 |
| 2018/0003839 | A1* | 1/2018 | Lowell | G01V 1/345 |
| 2019/0171869 | A1* | 6/2019 | Fortune | G06K 9/00315 |
| 2020/0110925 | A1* | 4/2020 | Wang | G06T 19/006 |

FOREIGN PATENT DOCUMENTS

| | | |
|---|---|---|
| KR | 10-0860989 B1 | 9/2008 |
| KR | 10-0935482 B1 | 1/2010 |
| KR | 10-0974293 B1 | 8/2010 |
| KR | 10-1198322 B1 | 11/2012 |

OTHER PUBLICATIONS

Ghent, John, et al. "Photo-Realistic Facial Expression Synthesis." *Image and Vision Computing* 23.12 (2005): 1041-1050. (10 pages, in English).

Jang, Yong-Suk, et al. "3D Face Modeling Based on 3D Morphable Shape Model." *The Journal of the Korea Contents Association* 8.1 (2008): 212-227. (In Korean with English abstract).

Ramirez-Valdez, Leonel, et al. "3D-Facial Expression Synthesis and its Application to Face Recognition Systems." *JART* 7.3 (2009). (17 pages, in English).

Tsai, Yihjia, et al. "Facial Expression Synthesis Based on Imitation." *International Journal of Advanced Robotic Systems* 9.4 (2012). (6 pages, in English).

* cited by examiner

FIG. 1
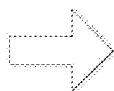
α                    kα, k=0.5

FACIAL EXPRESSION IMAGE PROCESSING METHOD AND APPARATUS

CROSS-REFERENCE TO RELATED APPLICATION(S)

This application claims the benefit under 35 U.S.C 119(a) of Chinese Patent Application No. 201611248661.1 filed on Dec. 29, 2016, in the State Intellectual Property Office of the People's Republic of China, and Korean Patent Application No. 10-2017-0084930 filed on Jul. 4, 2017, in the Korean Intellectual Property Office, the entire disclosures of which are incorporated herein by reference for all purposes.

BACKGROUND

1. Field

The following description relates to a facial expression image processing method and apparatus.

2. Description of Related Art

Human facial expression identification is widely used in areas such as entertainment, security, human-robot interaction, and social network analysis. A facial identification model is desired to be trained to identify a human facial expression and thus, training data including a great number of expression images is generally required. However, collecting expression images is relatively costly in terms of time, processing storage, and data transfer resources, and has many limitations. To address these issues, a great number of expression images may be generated using a synthesizing method to train an expression identification model.

However, because an expression change is not linear, the synthesizing method used to generate the expression images may acquire or result in a new expression feature by directly enlarging or reducing an expression feature magnitude already provided, having the effect that an expression image based on the new expression feature acquired in this way is relatively awkward, and greater in size than a real expression image. Thus, with typical technological approaches, an effect of a facial expression image may be unnatural as well as having significantly degraded accuracy in the ultimate recognition.

When an expression is analyzed, an expression space including an expression type (category) and all facial expression conditions may be set in advance. For example, an expression space includes an expression type (category), for example, a type C1, a type C2, and a type C3. Here, similar to the above, with typical technological approaches, in response to respective analyzed expression features $\alpha$ (being associated with a type C1) and k (being greater than 1 or close to 0), $k\alpha$ may easily exceed a range of the type C1 such that an effect of a corresponding human facial expression may be even more unnatural.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to a general aspect, a processor implemented method of processing a facial expression image, the method including acquiring an expression feature of each of at least two reference facial expression images; generating a new expression feature based on an interpolation value of the expression feature; and adjusting a target facial expression image based on the new expression feature and creating a new facial expression image.

The acquiring of the expression feature may include analyzing facial key point coordinates of the at least two reference facial expression images; acquiring an expression fitting result by fitting the facial key point coordinates; and setting the expression fitting result as the expression feature.

The method may further include setting one of the at least two reference facial expression images as the target facial expression image.

The generating of the new expression feature may include: acquiring an expression feature of the target facial expression image; and generating the new expression feature based on the expression feature of the target facial expression image and the expression feature of each of the at least two reference facial expression images.

The acquiring of the new expression feature may include: acquiring an interpolation value parameter of the expression feature; and generating the new expression feature based on the interpolation value parameter.

The acquiring of the interpolation value parameter may include substantially randomly generating the interpolation value parameter.

The generating of the new expression feature may include generating the new expression feature based on the following equation:

$$\alpha_{n+1} = c_1\alpha_1 + c_2\alpha_2 + \ldots + c_i\alpha_i + \ldots + c_n\alpha_n$$

wherein $\alpha_{n+1}$ denotes a new expression feature, $c_i$ denotes an interpolation value parameter, $1 \leq i \leq n$, $0 < c_i < 1$, and $c_1 + c_2 + \ldots + c_i + \ldots + c_n = 1$ are satisfied, $\alpha_i$ denotes an expression feature of a reference expression image i, n denotes a number of reference expression images, and n is greater than or equal to 2.

The expression feature of each of the at least two reference facial expression images may be associated with an expression feature of a substantially identical type.

According to another general aspect, a facial expression image processing apparatus includes an expression feature acquirer configured to acquire an expression feature of each of at least two reference facial expression images; an expression feature interpolator configured to generate a new expression feature based on an interpolation value of the expression feature; and an expression image synthesizer configured to adjust a target facial expression image based on the new expression feature and create a new facial expression image.

The expression feature acquirer may be configured to analyze facial key point coordinates of the at least two reference facial expression images, acquire an expression fitting result by fitting the facial key point coordinates, and set the expression fitting result as the expression feature.

The apparatus may further include a target image acquirer configured to set one of the at least two reference facial expression images as the target facial expression image.

The expression feature interpolator may be configured to acquire an expression feature of the target facial expression image and generate the new expression feature based on the expression feature of the target facial expression image and the expression feature of each of the at least two reference facial expression images.

The expression feature interpolator may include: a parameter acquirer configured to acquire an interpolation value parameter of the expression feature; and an interpolator configured to acquire the new expression feature based on the interpolation value parameter.

The parameter acquirer may be configured to substantially randomly acquire the interpolation value parameter.

The interpolator may be configured to acquire the new expression feature based on the following equation:

$$\alpha_{n+1} = c_1\alpha_1 + c_2\alpha_2 + \ldots c_i\alpha_i + \ldots + c_n\alpha_n$$

wherein $\alpha_{n+1}$ denotes a new expression feature, $c_i$ denotes an interpolation value parameter, $1 \leq i \leq n$, $0 < c_i < 1$, and $c_1 + c_2 + \ldots + c_i + \ldots + c_n = 1$ are satisfied, and $\alpha_i$ denotes an expression feature of a reference expression image i, n denotes a number of reference expression images, and n is greater than or equal to 2.

The expression feature of each of the at least two reference facial expression images may be associated with an expression feature of a substantially identical type.

A non-transitory computer readable storage medium may store instructions that, when executed by the processor, cause the processor to perform the method.

According to another general aspect, a processor implemented method of processing a facial expression image to train a facial recognition device, including: acquiring an expression feature of each of at least two reference facial expression images; generating synthesized images, the synthesized images respectively comprising at least a portion of either one or both of the two reference facial expression images and a new expression feature based on an interpolation value of the expression feature; training a neural network with the synthesized images to recognize facial expressions; recognizing a user's facial expression based on the trained neural network and an image of the user captured by a camera; and, interacting with the user based upon the recognized user's facial expression.

Other features and aspects will be apparent from the following detailed description, the drawings, and the claims.

BRIEF DESCRIPTION OF THE DRAWINGS

FIG. 1 illustrates an example of an expression image synthesizing method.

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 2:
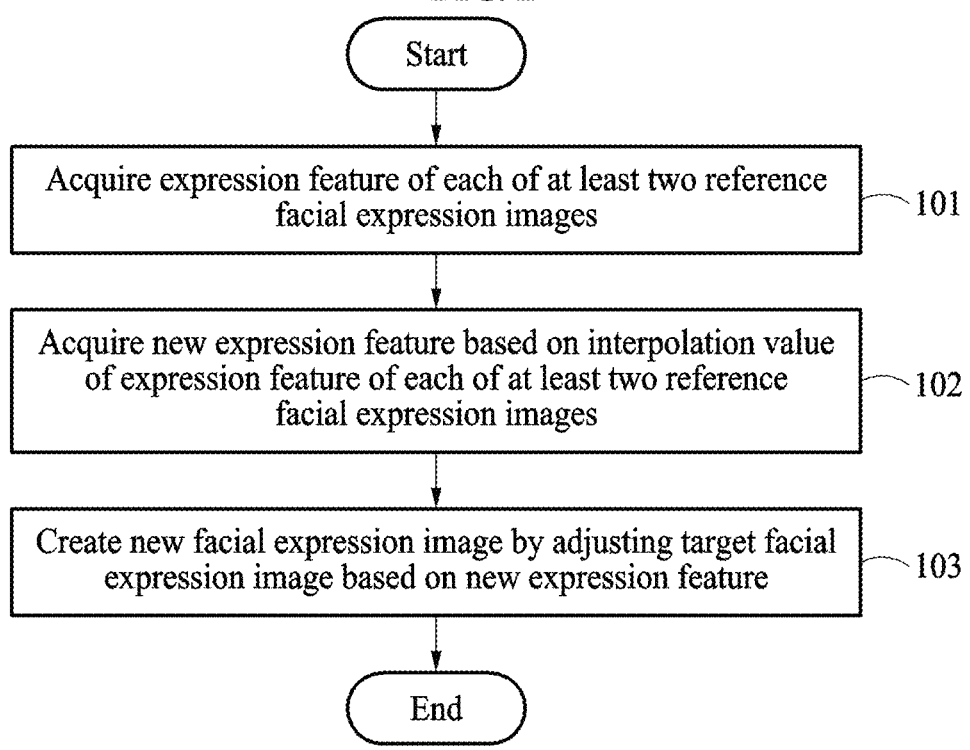
FIG. 2 is a flowchart illustrating an example of a method of processing a facial expression image.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. Hereinafter, reference will now be made in detail to examples with reference to the accompanying drawings, wherein like reference numerals refer to like elements throughout.

Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which examples belong and in view of the present disclosure. It will be further understood that terms, such as those defined in commonly-used dictionaries, should be interpreted as having a meaning that is consistent with their meaning in the context of the relevant art and the present disclosure and will not be interpreted in an idealized or overly formal sense unless expressly so defined herein.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here for clarity and conciseness.

FIG. 1 illustrates an example of an expression image synthesizing method using expression images acquired based on the expression image synthesizing method for identifying a human facial expression.

The expression image synthesizing method may be classified, for example, into two types.

For example, a first type of the expression image synthesizing method may directly control an expression image and acquire a new expression image by either one or both of moving one or more pixel positions and/or changing one or more pixel luminance values of the expression image. The new expression image acquired based on the first type of the method may be significantly different from an image acquired by photographing a real expression.

A second type of the expression image synthesizing method may separately analyze an expression feature of an expression image, acquire a new expression feature based on the expression feature obtained through a correction analysis, and acquire a new expression image by fusing the new expression feature and an original expression image. The new expression image acquired based on the second type of the method may be similar to a real expression image.

An expression feature $\alpha$ of a human facial expression image may be analyzed, a new expression feature may be acquired by setting a control constant k and calculating an expression feature $k\alpha$, and a new human facial expression image may be created by adjusting the human facial expression image.

In response to the control constant k being greater than 1, the expression feature $k\alpha$ may be associated with a stronger expression than the expression feature $\alpha$. For example, a laughing expression is stronger than a smiling expression.

In response to the control constant k being greater than 0 and less than 1, the expression feature $k\alpha$ may be associated with a weaker expression than the expression feature $\alpha$. In response to k corresponding to 0.5, an example of the new human facial expression image created based on the second type of the expression image synthesizing method is as illustrated in FIG. 1. That is, a smiling expression in a right image may be acquired, according to an embodiment, by reducing a laughing expression in a left image.

FIG. 2 is a flowchart illustrating an example of a method of processing an image.

Referring to FIG. 2, facial expression images may be synthesized based on the method of processing the image. Also, the method of processing the image may be used to train an expression identification model and may be applicable to a drawing processing program and a video processing program. The method of processing the image may synthesize human facial expression images and animal facial expression images, for example, a facial expression image of a gorilla, dog, cat, or other suitably similar animal.

In operation 101, an image processing apparatus acquires an expression feature of each of at least two reference facial expression images. A reference facial expression image may be understood as a standard facial expression image such as a smile, frown, grimace, or other standard facial expression contained within an image. The expression features of the at least two reference facial expression images may be, according to embodiment, associated with a substantially identical type. In response to at least two reference facial expression images being associated with at least two types of expression features being used, unique facial expression images may be synthesized.

In operation 102, the image processing apparatus acquires a new expression feature based on an interpolation value of the expression feature of each of the at least two reference facial expression images.

In an example, an interpolation value parameter is heuristically acquired, such as by aggregate analysis, such as by back propagating, deep learning employing a neural network, or seeding a pseudorandom function according to embodiment, and a new expression feature is acquired or generated based on the interpolation value parameter. Even though reference facial expression images are substantially identical, different interpolation value parameters are substantially randomly (such as by pseudorandom generation) acquired whenever facial expression images are synthesized and thus, different facial expression images may be synthesized by acquiring different new expression features. An interpolation value parameter may indicate a value preset by a user, by neural network/deep learning, programmatically acquired, or generated based on heuristic analysis, according to embodiment.

In another example, a new expression feature is acquired based on an expression feature interpolation value of each of at least two reference facial expression images using Equation 1, for example.

$$\alpha_{n+1} = c_1\alpha_1 + c_2\alpha_2 + \ldots + c_i\alpha_i + \ldots + c_n\alpha_n \quad [\text{Equation 1}]$$

Here, $\alpha_{n+1}$ denotes a new expression feature, $c_i$ denotes an interpolation value parameter, $1 \leq i \leq n$, $0 < c_i < 1$, and $c_1 + c_2 + \ldots + c_i + \ldots + c_n = 1$ are satisfied, $\alpha_i$ denotes an expression feature of the reference expression image i, n denotes a number of reference expression images, and n is greater than or equal to 2.

In still another example, one of at least two reference facial expression images is set as a target facial expression image. The target facial expression image is closely related to a new expression feature. The facial expression image acquired or generated using the target facial expression image may be significantly more natural and realistic based on objective features and subjective human/deep learning analyses.

At least two reference facial expression images may be independent of the target facial expression image, according to embodiment. For example, the target facial expression image may not include a smiling expression, and the at least two reference facial expression images may include a laughing expression. Here, a new expression feature of the laughing expression may be generated based on a value of expression feature difference between the at least two reference facial expression images, and a smiling expression may be included in the target facial expression image by adjusting the target facial expression image based on the new expression feature, according to embodiment.

Hereinafter, detailed description of an interpolation value and a new expression feature are further provided.

First Example of Interpolation Value

An expression feature of one target facial expression image and an expression feature of one reference facial expression image may be acquired. An expression feature of each of two reference facial expression images may be acquired, and one of the two reference facial expression images may be set as the target facial expression image. Also, a new expression feature may be acquired based on an interpolation value of the expression feature of the target facial expression image and the expression feature of the reference facial expression image using Equation 2, for example.

$$\alpha_3 = c\alpha_1 + (1-c)\alpha_2 \quad \text{[Equation 2]}$$

In Equation 2, c denotes an interpolation value parameter, c is greater than 0 and less than 1, $\alpha_3$ denotes a new expression feature, $\alpha_1$ denotes an expression feature of a target facial expression image, and $\alpha_2$ denotes an expression feature of a reference facial expression image. Here, c may be a value, for example, 0.1, 0.26, 0.5, 0.72, 0.88, and 0.98.

When the facial expression images are synthesized, new, different (according to embodiment) expression features may be acquired by setting different interpolation value parameters, and the new different facial expression images may be synthesized even when the target facial expression image is identical to the reference facial expression image. A great number of facial expression images may be synthesized by setting the different interpolation value parameters.

Second Example of Interpolation Value

An expression feature of one target facial expression image, an expression feature of a first reference facial expression image, and an expression feature of a second reference facial expression image may be acquired. That is, an expression feature of each of three reference facial expression images may be acquired, one of the three reference facial expression images may be set as the target facial expression image, and the other two reference facial expression images may be set as the first reference facial expression image and the second reference facial expression image. Also, a new expression feature may be acquired based on an interpolation value of the expression feature of the target facial expression image, the expression feature of the first reference facial expression image, and the expression feature of the second reference facial expression image using Equation 3, for example.

$$\alpha_4 = c_1\alpha_1 + c_2\alpha_2 + c_3\alpha_3 \quad \text{[Equation 3]}$$

Here, $c_1$, $c_2$, and $c_3$ denote interpolation parameters, $c_1 c_2 c_3 = 1$, $0 < c_1 < 1$, $0 < c_2 < 1$, and $0 < c_3 < 1$, are satisfied, $\alpha_4$ denotes a new expression feature, $\alpha_1$ denotes an expression feature of a target facial expression image, $\alpha_2$ denotes an expression feature of a first reference facial expression image, and $\alpha_3$ denotes an expression feature of a second reference facial expression image.

In operation 103, the image processing apparatus creates the new facial expression image by adjusting the target facial expression image based on the acquired new expression feature.

Although a number of expression features of reference facial expression images and interpolation value parameters are predetermined for ease of description, the foregoing is not limited thereto. The number of expression features of reference facial expression images and the interpolation value parameters may vary.

A more types of interpolation equations may be easily conceived and a more number of example embodiments may be generated based on an interpolation value equation by those skilled in the art by combining the descriptions of the present disclosure, the common sense, and the published technologies. When such example embodiments are about acquiring a new expression feature based on different expression feature interpolation values, the example embodiments all belong to the scope of protection.

Figure 3:
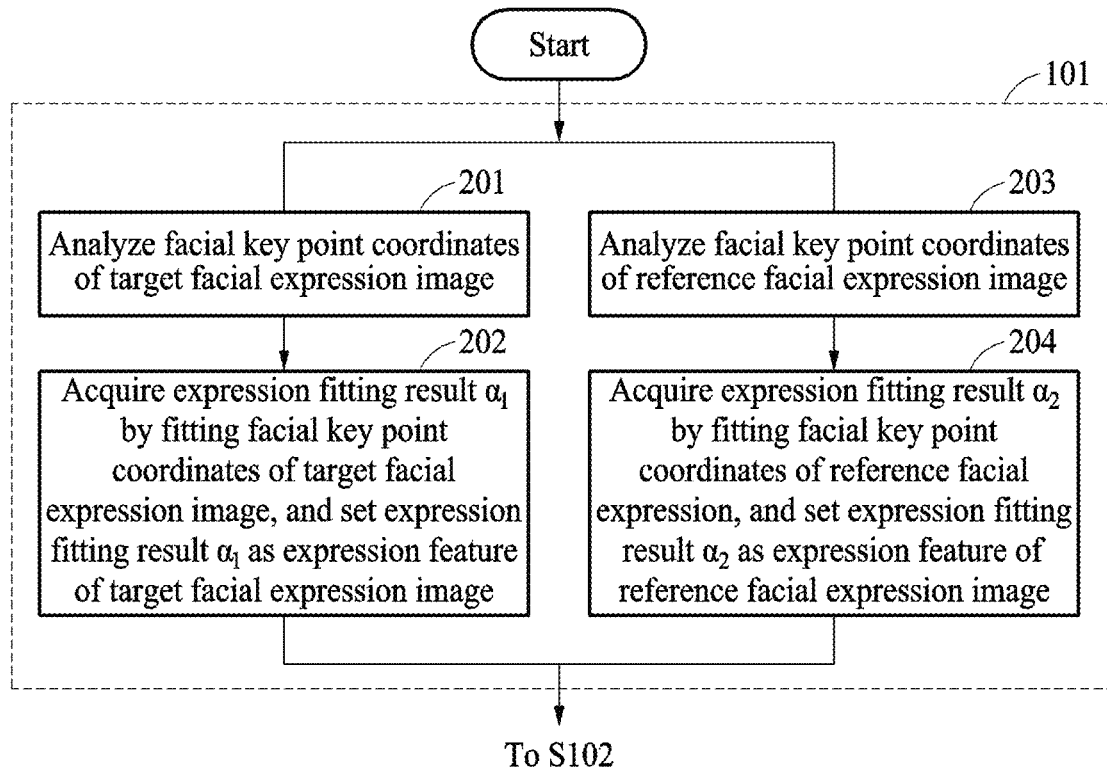
FIG. 3 is a flowchart illustrating another example of a method of processing an image.
Figure 4:
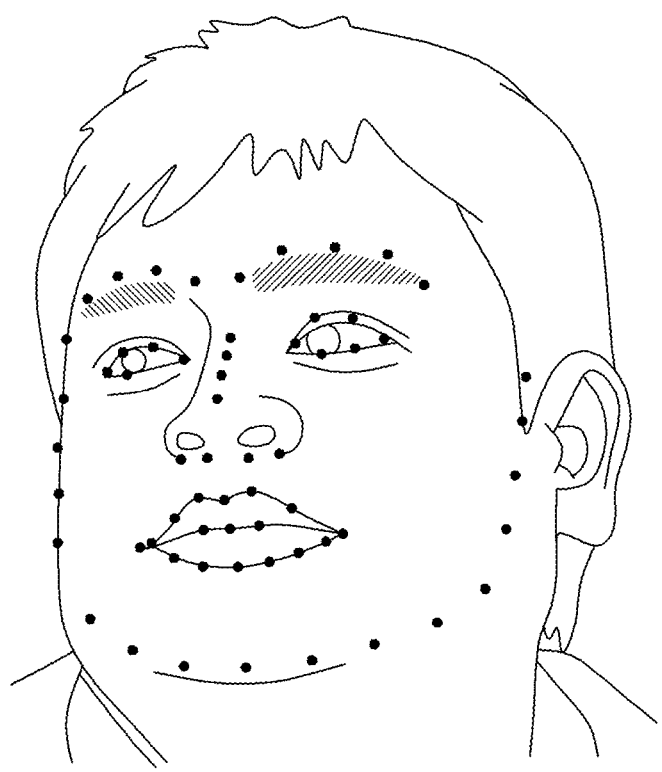
FIG. 4 illustrates an example of a facial key point, such as the facial key point illustrated in FIG. 3.

FIG. 3 is a flowchart illustrating another example of a method of processing an image. FIG. 4 illustrates an example of a facial key point, such as the facial key point illustrated in FIG. 3, though embodiments are not limited thereto.

Referring to FIGS. 3 and 4, in operation 201, an image processing apparatus analyzes facial key point coordinates of a target facial expression image to acquire an expression feature of the target facial expression image. The facial key point coordinates may be 68 coordinates in a diamond shape as illustrated in FIG. 4. The facial key point coordinates may be defined based on an automatic measurement method or an artificial method. Also, the facial key point coordinates may include identification information and expression information on a face. An operation of analyzing the facial key point coordinates of the target facial expression image includes an operation of selecting different positions and different numbers of facial key point coordinates based on different algorithms.

In operation 202, the image processing apparatus acquires an expression fitting result $\alpha_1$ by fitting the facial key point coordinates of the target facial expression image in a preset expression space, and set the expression fitting result $\alpha_1$ as an expression feature of the target facial expression image. Here, the operation of acquiring the expression fitting result $\alpha_1$ by fitting the facial key point coordinates of the target facial expression image in the preset expression space may include the following operations.

In operation 11, a preset angle θ is acquired.

In operation 12, $f(\theta) = I_s B_s + \alpha_e B_e$ is calculated. Here, $B_s = \{b_{s1}, b_{s2}, \ldots, b_{si}, \ldots, b_{sn}\}$, $I_s = \{a_{s1}, a_{s2}, \ldots, a_{si}, \ldots, a_{sn}\}$, $a_{si} = R(x1; \theta) \cdot b_{si} \cdot \cos<R(x1; \theta), b_{si}>$, $B_e = \{b_{e1}, b_{e2}, \ldots, b_{ei}, \ldots, b_{en}\}$, $\alpha_e = \{a_{e1}, a_{e2}, \ldots, a_{ei}, \ldots, a_{en}\}$, and $a_{ei} = R(x1; \theta) \cdot b_{ei} \cdot \cos<R(x1; \theta), b_{ei}>$ are satisfied.

In operation 13, $\|x1 - f(\theta)\|$ is calculated and $\|x1 - f(\theta)\| = p1$ is set.

In operation 14, $\theta - d*f'(\theta)$ is defined as a new θ.

In operation 15, $f(\theta) = I_s B_s + \alpha_e B_e$ is calculated again using the new θ. Here, $B_s = \{b_{s1}, b_{s2}, \ldots, b_{si}, \ldots, b_{sn}\}$, $I_s = \{a_{s1}, a_{s2}, \ldots, a_{si}, a_{sn}\}$, $a_{si} = R(x1; \theta) \cdot b_{si} \cdot \cos<R(x1; \theta), b_{si}>$, $B_e = \{b_{e1}, b_{e2}, \ldots, b_{ei}, \ldots, b_{en}\}$, $\alpha_e = \{a_{e1}, a_{e2}, \ldots, a_{ei}, \ldots, a_{en}\}$, and $a_{ei} = R(x1; \theta) \cdot b_{ei} \cdot \cos<R(x1; \theta), b_{ei}>$ are satisfied.

In operation 16, $\|x1 - f(\theta)\|$ is calculated based on $f(\theta)$ calculated in operation 15.

In operation 17, it is verified whether $\|x1 - f(\theta)\| - p1 \leq g$ is satisfied.

Here, in response to $\|x1 - f(\theta)\| - p1 \leq g$ being satisfied, $\alpha_1 = \{a_{11}, a_{12}, \ldots, a_{1i}, \ldots, a_{1n}\} = \alpha_e$ and $\alpha_e = \{a_{e1}, a_{e2}, \ldots, a_{ei}, \ldots, a_{en}\}$ are satisfied, and θ indicates an angle value of rebuilt new coordinates.

In response to $\|x1 - f(\theta)\| - p1 > g$ being satisfied, $\|x1 - f(\theta)\| = p1$ is set to return to operation 14.

Here, θ denotes a facial posture parameter, $f(\theta)$ denotes a column vector function of facial key point coordinates calculated based on a fitting coefficient, $f'(\theta)$ denotes a derived function of the column vector function $f(\theta)$, x1 denotes a column vector of the facial key point coordinates of the target facial expression image, $B_s$ denotes a pre-trained facial identification main component analyzing model, $I_s$ denotes a fitting coefficient of a facial identification main component analyzing model, $b_{si}$ denotes an i-th latitude element of the facial identification main component analyzing model, n denotes a model latitude degree, $a_{si}$ denotes an inner product of two vectors, $R(x1; \theta)$ denotes new coordinates obtained in response to the column vector x1 rotating based on the facial posture parameter θ, $\cos<R(x1; \theta), b_{si}>$ denotes a cosine value of an angle between $R(x1; \theta)$ and $b_{si}$, $B_e$ denotes a pre-trained facial expression main component analyzing model, $\alpha_e$ denotes a fitting coefficient of a facial expression main component analyzing model, $b_{ei}$ denotes an i-th latitude element of the facial expression main component analyzing model, $a_{ei}$ denotes an inner product of two vectors, $\cos<R(x1; \theta), b_{ei}>$ denotes a cosine value of an angle between $R(x1; \theta)$ and $b_{ei}$, $\|x1-f(\theta)\|$ denotes a norm obtained by subtracting a column vector corresponding element of the column vector x1 and the column vector function $f(\theta)$, d denotes a preset control value, g denotes a preset value, and p1 denotes a norm corresponding to $\theta$.

Each facial key point coordinates are associated with a three-dimensional (3D) column vector, and x1 may be a column vector of 3×68 rows. The preset value g is a value close to 0 and set to be, for example, 0.01, 0.001, or 0.0001, depending on an actual application.

An expression feature may be acquired through non-fitting that does not perform fitting on the facial key point coordinates, other than the above-described methods. Also, an expression feature of a facial expression image may be acquired based on other methods, for example, an image scanning method or other related technologies, without using the facial key point coordinates.

Operations 201 and 202 are example processes for acquiring the expression feature of the target facial expression image.

Operations 203 and 204 are processes for acquiring the expression feature of the reference facial expression image. Operations 201, 202, 203, and 204 may have no sequential relation.

In operation 203, the image processing apparatus analyzes the facial key point coordinates of the reference facial expression image to acquire the expression feature of the reference facial expression image.

In operation 204, the image processing apparatus acquires an expression fitting result $\alpha_2$ by fitting the facial key point coordinates of the reference facial expression image in a preset expression space, and set the expression fitting result $\alpha_2$ as the expression feature of the reference facial expression image. In an example, the facial key point coordinates of the reference facial expression image in a preset expression space is manually set in advance.

Here, an operation of acquiring the expression fitting result $\alpha_2$ by fitting the facial key point coordinates of the reference facial expression image in the preset expression space may include the following operations.

In operation 21, a preset value $\theta$ is acquired.

In operation 22, $f(\theta)=I_sB_s+\alpha_eB_e$ is calculated. Here, $B_s=\{b_{s1}, b_{s2}, \ldots, b_{si}, \ldots, b_{sn}\}$, $I_s=\{a_{s1}, a_{s2}, \ldots, a_{sn}\}$, $a_{si}=R(x2; \theta) \cdot b_{si} \cdot \cos<R(x2; \theta), b_{si}>$, $B_e=\{b_{e1}, b_{e2}, \ldots, b_{ei}, \ldots, b_{en}\}$, $\alpha_e=\{a_{e1}, a_{e2}, \ldots, a_{ei}, \ldots, a_{en}\}$, and $a_{ei}=R(x2; \theta) \cdot b_{ei} \cdot \cos<R(x2; \theta), b_{ei}>$ are satisfied.

In operation 23, min $\|x2-f(\theta)\|$ is calculated and $\|x2-f(\theta)\|=p2$ is set.

In operation 24, $\theta-d^*f'(\theta)$ is defined as a new $\theta$.

In operation 25, $f(\theta)=I_sB_s+\alpha_eB_e$ is calculated again based on the new $\theta$. Here, $B_s=\{b_{s1}, b_{s2}, \ldots, b_{si}, \ldots, b_{sn}\}$, $I_s=\{a_{s1}, a_{s2}, \ldots, a_{si}, \ldots, a_{sn}\}$, $a_{si}=R(x2; \theta) \cdot b_{si} \cdot \cos<R(x2; \theta), b_{si}>$, $B_e=\{b_{e1}, b_{e2}, \ldots, b_{ei}, \ldots, b_{en}\}$, $\alpha_e=\{a_{e1}, a_{e2}, \ldots, a_{ei}, \ldots, a_{en}\}$, and $a_{ei}=R(x2; \theta) \cdot b_{ei} \cdot \cos<R(x2; \theta), b_{ei}>$ are satisfied.

In operation 26, $\|x2-f(\theta)\|$ is calculated based on $f(\theta)$ calculated in operation 25.

In operation 27, it is verified whether $\|x2-f(\theta)\|-p2 \leq g$ is satisfied.

Here, in response to $\|x2-f(\theta)\|-p2 \leq g$ being satisfied, $\alpha_2=\{a_{21}, a_{22}, \ldots, a_{2i}, \ldots, a_{2n}\}=\alpha_e$ and, $\alpha_e=\{a_{e1}, a_{e2}, \ldots, a_{ei}, \ldots, a_{en}\}$ are satisfied.

In response to $\|x2-f(\theta)\|-p2>g$ being satisfied, $\|x2-f(\theta)\|=p2$ is set to return to operation 24.

Here, $\theta$ denotes a facial posture parameter, $f(\theta)$ denotes a column vector function of facial key point coordinates calculated based on a fitting coefficient, $f'(\theta)$ denotes a derived function of the column vector function $f(\theta)$, x2 denotes a column vector of the facial key point coordinates of the target facial expression image, $B_s$ denotes a pre-trained facial identification main component analyzing model, $I_s$ denotes a fitting coefficient of a facial identification main component analyzing model, $b_{si}$ denotes an i-th latitude element of the facial identification main component analyzing model, n denotes a model latitude degree, $a_{si}$ denotes an inner product of two vectors, $R(x2; \theta)$ denotes new coordinates obtained in response to the column vector x2 rotating based on the facial posture parameter $\theta$, $\cos<R(x2; \theta), b_{si}>$ denotes a cosine value of an angle between $R(x2; \theta)$ and $b_{si}$, $B_e$ denotes a pre-trained facial expression main component analyzing model, $\alpha_e$ denotes a fitting coefficient of a facial expression main component analyzing model, $b_{ei}$ denotes an i-th latitude element of the facial expression main component analyzing model, $a_{ei}$ denotes an inner product of two vectors, $\cos<R(x2; \theta), b_{ei}>$ denotes a cosine value of an angle between $R(x2; \theta)$ and $b_{ei}$, $\|x2-f(\theta)\|$ denotes a norm obtained by subtracting a column vector corresponding element of the column vector x2 and the column vector function $f(\theta)$, d denotes a preset control value, g denotes a preset value, and p2 denotes a norm corresponding to $\theta$.

An expression feature may be acquired through non-fitting that does not perform fitting on the facial key point coordinates, other than the above-described methods. Also, an expression feature of a facial expression image may be acquired based on other methods, for example, an image scanning method or other related technologies, without using the facial key point coordinates.

Figure 5:
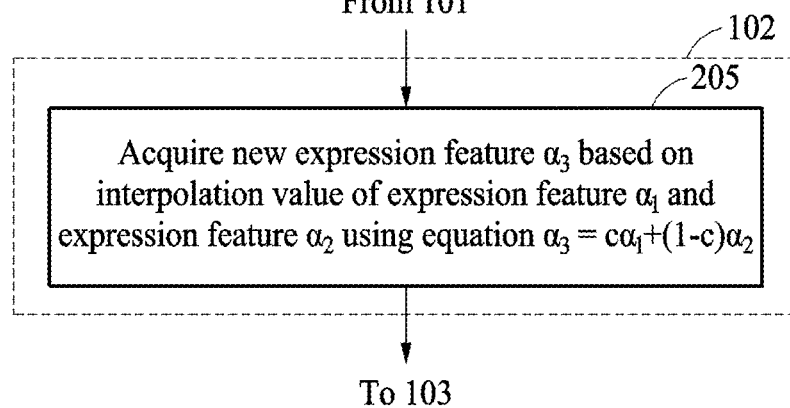
FIG. 5 is a flowchart illustrating still another example of a method of processing an image including a facial expression.
Figure 6:
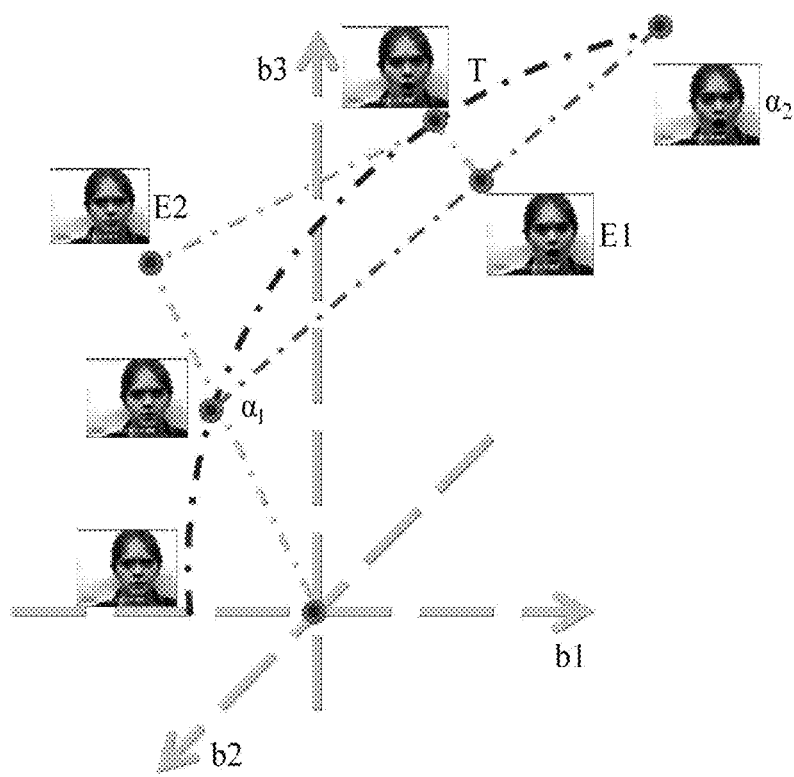
FIG. 6 illustrates an example of an expression synthesized in an essential space.

FIG. 5 is a flowchart illustrating still another example of a method of processing an image, and FIG. 6 illustrates an example of an expression synthesized in an essential space.

Referring to FIG. 5, in operation 205, an image processing apparatus acquires a new expression feature $\alpha_3$ based on an interpolation value of an expression feature of a target facial expression image and an expression feature of a reference facial expression image using, for example, Equation 4. Equation 4 may be substantially identical to Equation 2.

$$\alpha_3=c\alpha_1+(1-c)\alpha_2 \qquad \text{[Equation 4]}$$

In Equation 4, c denotes an interpolation value parameter, c is greater than 0 and less than 1, $\alpha_3$ denotes the new expression feature, $\alpha_1$ denotes an expression feature of a target facial expression image, and $\alpha_2$ denotes an expression feature of a reference facial expression image.

A preset expression space S includes seven types of expressions, for example, joy, a grief, anger, irritation, fear, and a neutral blank expression, though other types of expressions are also possible and contemplated herein. A space occupied by a portion of expression in the expression space S is defined as a target space of the types of expressions. For example, the expression features $\alpha_1$ and $\alpha_2$ may be associated with a substantially identical type of expression and a substantially identical essential space. Each of the points of the line connecting the expression features $\alpha_1$ and $\alpha_2$ may be present within a convex space including a minimum target space.

Referring to FIG. 6, a target space of an expression $\{\alpha_1, \alpha_2\}$ is indicated in a dark curved dashdotted line in an expression space having b1, b2, and b3 as coordinates axes.

Here, an image E2 is generated and acquired by extending the expression feature $\alpha_1$. However, the image E2 is distanced from the essential space associated with an expression.

An image E1 is generated and acquired based on the above-described method. In comparison with the image E2 acquired based on the related technology, the image E1 is closer to the target space within the convex space including the minimum target space, and an effect of a synthesized facial expression image may be relatively natural.

Figure 7:
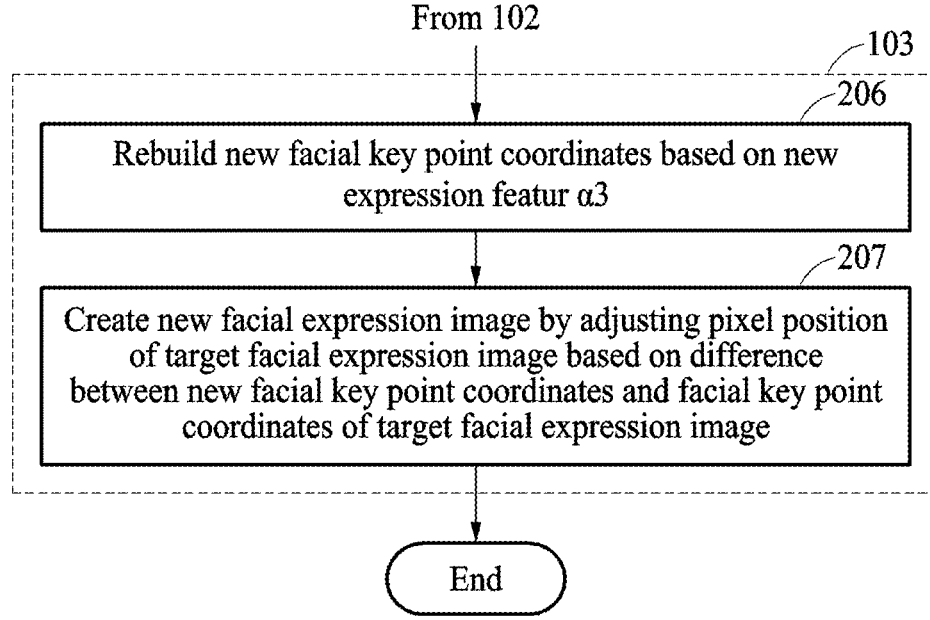
FIG. 7 is a flowchart illustrating a further example of a method of processing an expression image.
Figure 8:
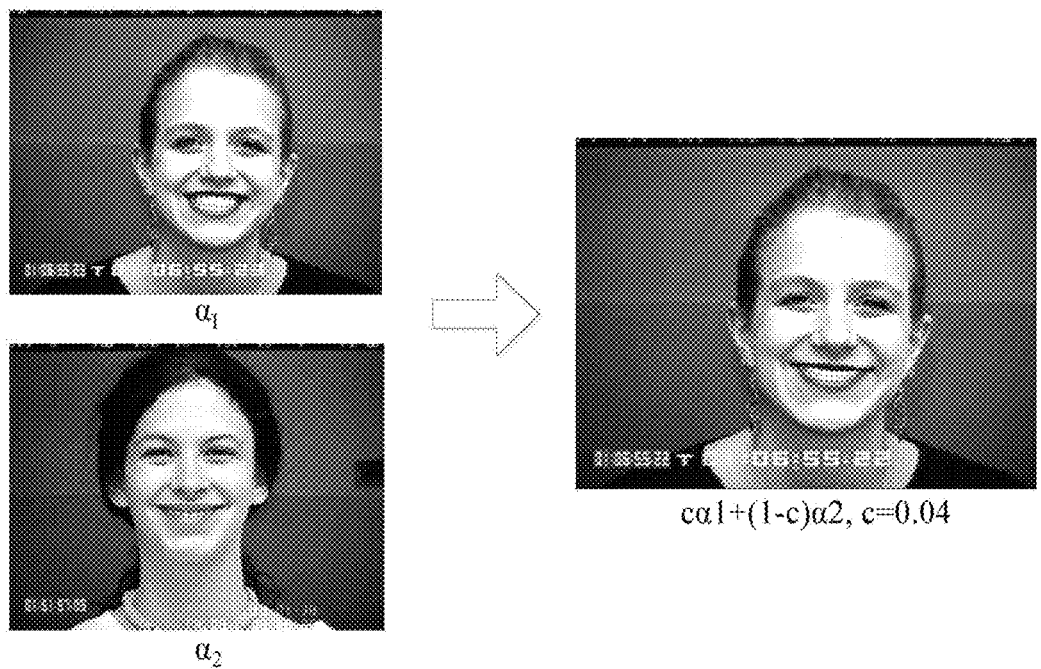
FIG. 8 illustrates an example of a facial expression image newly acquired based on a method of processing an image.
Figure 9:
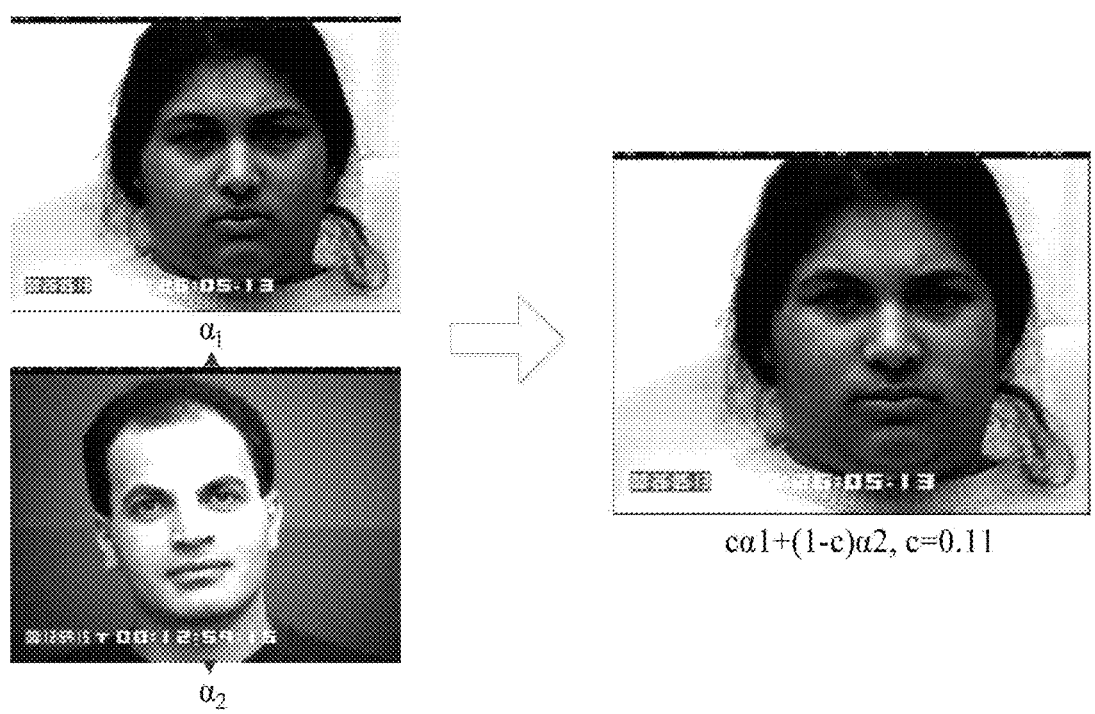
FIG. 9 illustrates another example of a facial expression image newly acquired based on a method of processing an image.

FIG. 7 is a flowchart illustrating a further example of a method of processing a facial expression image, FIG. 8 illustrates an example of a facial expression image newly acquired based on a method of processing an image, and FIG. 9 illustrates another example of a facial expression image newly acquired based on a method of processing an image.

Referring to FIG. 7, in operation 206, an image processing apparatus rebuilds new facial key point coordinates based on a new expression feature $\alpha_3$.

New facial key point coordinates f'(θ) are as shown, for example, in Equation 5.

$$f(\theta')=I_s B_s + \alpha_3 B_e \qquad \text{[Equation 5]}$$

In Equation 5, $B_s=\{b_{s1}, b_{s2}, \ldots, b_{si}, \ldots, b_{sn}\}$, $I_s=\{a_{s1}, a_{s2}, \ldots, a_{si}, \ldots, a_{sn}\}$, $a_{si}=R(x1'; \theta') \cdot b_{si} \cdot \cos<R(x1'; \theta'), b_{si}>$, $B_e=\{b_{e1}, b_{e2}, \ldots, b_{ei}, \ldots, b_{en}\}$, $\alpha_3=\{a_{31}, a_{32}, \ldots, a_{3i}, \ldots, a_{3n}\}$, and $a_{3i}=R(x1'; \theta') \cdot b_{ei} \cdot \cos<R(x1'; \theta'), b_{ei}>$ are satisfied, and θ' indicates an angle value of rebuilt new coordinates.

In operation 207, the image processing apparatus creates a new facial expression image by adjusting a pixel position of a target facial expression image based on a difference between new facial key point coordinates and facial key point coordinates of the target facial expression image.

The new facial expression image may be created by moving a pixel position corresponding to the facial key point coordinates of the target facial expression image to a pixel position corresponding to the new facial key point coordinates. A pixel movement is associated with the related technology and the related description is not provided further herein for clarity and conciseness.

FIG. 8 illustrates an example of a facial expression image newly acquired based on a method of processing an image. Here, an interpolation value parameter c corresponds to 0.04 in an example.

FIG. 9 illustrates another example of a facial expression image newly acquired based on a method of processing an image. Here, an interpolation value parameter c corresponds to 0.11 in another example.

When FIGS. 8 and 9 are compared to FIG. 1, images of FIGS. 8 and 9 are more natural and closer to actual facial expressions.

A new facial expression image may be generated based on the method of processing the image by performing an performance test, such as, for example, the Cohn-Kanade (CK+) human facial expression database. The generated new facial expression image may be trained as training data for training an expression identification model in a back propagated neural network or deep learning machine. When compared with the related technology by identifying expressions using the expression identification model, an identified error rate is reduced by approximately 25% in an example.

Hereinafter, description of an image processing apparatus is further provided. The method embodiments and apparatus embodiments may belong to the same design, and are closely related to each other. Detailed descriptions not provided with reference to the apparatus embodiments may refer to the descriptions of the method embodiments provided above for clarity and conciseness purposes.

Figure 10:
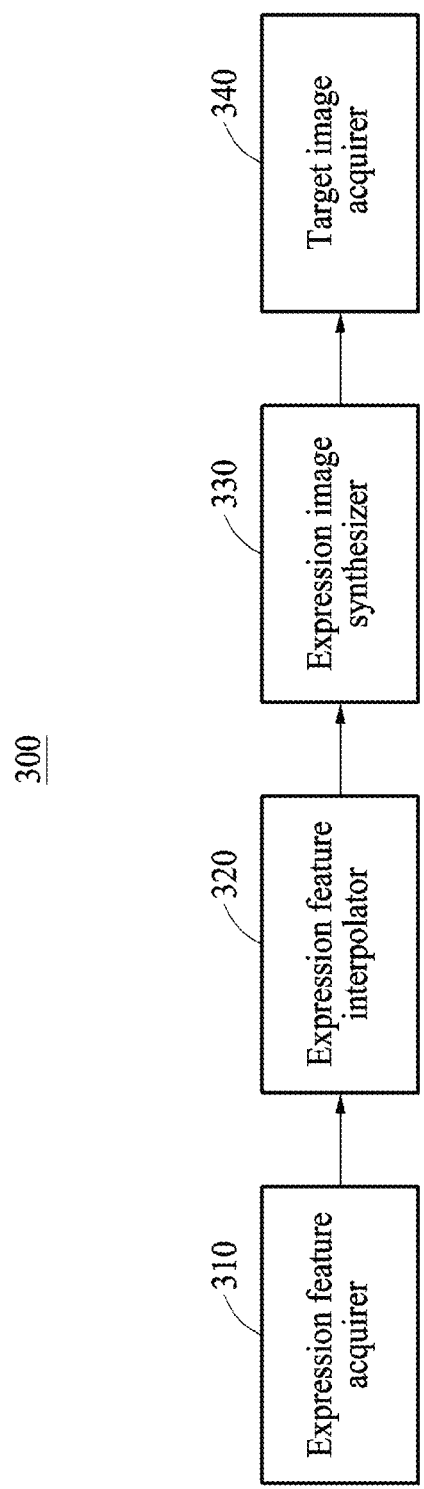
FIG. 10 is a block diagram illustrating an example of an image processing apparatus.
Figure 11:
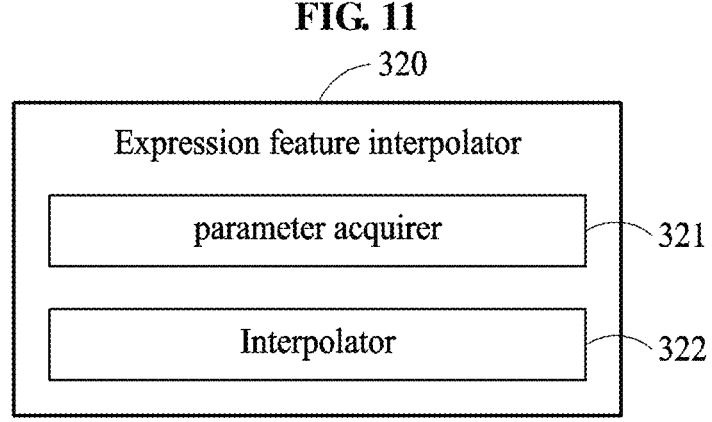
FIG. 11 is a block diagram illustrating an example of an expression feature interpolator, such as the one illustrated in FIG. 10.

FIG. 10 is a block diagram illustrating an example of a facial expression image processing apparatus, and FIG. 11 is a block diagram illustrating an example of an expression feature interpolator illustrated in FIG. 10.

Referring to FIGS. 10 and 11, an image processing apparatus 300 synthesizes a facial expression image. The image processing apparatus 300 includes an expression feature acquirer 310, an expression feature interpolator 320, an expression image synthesizer 330, and a target image acquirer 340.

The expression feature acquirer 310 acquires an expression feature each of at least two reference facial expression images.

The expression feature interpolator 320 acquires or generates a new expression feature based on an interpolation value of an expression feature of each of the at least two reference facial expression images.

The expression feature interpolator 320 includes a parameter acquirer 321 and an interpolator 322. Here, the parameter acquirer 321 acquires an interpolation parameter. For example, the parameter acquirer 321 randomly acquires the interpolation value parameter. The interpolator 322 may acquire a new expression feature based on the interpolation value of the expression feature of each of the at least two reference facial expression images based on the interpolation value parameter.

The expression image synthesizer 330 creates a new facial expression image by adjusting a target facial expression image based on the new expression feature. For example, the expression image synthesizer 330 acquires a new expression feature based on the interpolation and/or extrapolation value of each of the expression feature of each of at least two reference facial expression images. The expression image synthesizer 330 may acquire the new expression feature using Equation 6, for example.

$$\alpha_{n+1} = c_1\alpha_1 + c_2\alpha_2 + \ldots + c_i\alpha_i + \ldots c_n\alpha_n \qquad \text{[Equation 6]}$$

In Equation 6, $\alpha_{n+1}$ denotes a new expression feature, $c_i$ denotes an interpolation value parameter, $1 \leq i \leq n$, $0 < c_i < 1$, and $c_1 + c_2 + \ldots + c_i + \ldots + c_n = 1$ are satisfied, $\alpha_i$ denotes an expression feature of a reference expression image i, and n denotes a number of reference expression images, and n is greater than or equal to 2. Here, an expression feature of each of at least two reference facial expression images is associated with an identical type of expression.

The target image acquirer 340 sets one of the at least two reference facial expression images as a target facial expression image.

The image processing apparatus 300 operates as follows.

The target image acquirer 340 analyzes facial key point coordinates of the target facial expression image, acquires an expression fitting result $\alpha_i$, by fitting the facial key point coordinates of the target facial expression image in a preset expression space, and sets the expression fitting result $\alpha_1$ as an expression feature of the target facial expression image. Also, the target image acquirer 321 may analyze facial key point coordinates of the reference facial expression image and acquire an expression fitting result $\alpha_2$ by fitting the facial key point coordinates of the reference facial expression image in the preset expression space, and set the expression fitting result $\alpha_2$ as the expression feature of the reference facial expression image.

Here, the target image acquirer 340 may acquire the expression fitting result $\alpha_1$ by fitting the face key point coordinates of the target facial expression image based on the following operations.

In operation 11, a preset angle $\theta$ is acquired.

In operation 12, $f(\theta)=I_sB_s+\alpha_eB_e$ is calculated. Here, $B_s=\{b_{s1}, b_{s2}, \ldots, b_{si}, \ldots, b_{sn}\}$, $I_s=\{a_{s1}, a_{s2}, \ldots, a_{si}, \ldots, a_{sn}\}$, $a_{si}=R(x1;\theta)\cdot b_{si}\cdot\cos<R(x1;\theta), b_{si}>$, $B_e=\{b_{e1}, b_{e2}, \ldots, b_{ei}, \ldots, b_{en}\}$, $\alpha_e=\{a_{e1}, a_{e2}, \ldots, a_{ei}, \ldots, a_{en}\}$, and $a_{ei}=R(x1;\theta)\cdot b_{ei}\cdot\cos<R(x1;\theta), b_{ei}>$ are satisfied.

In operation 13, $\|x1-f(\theta)\|$ is calculated and $\|x1-f(\theta)\|=p1$ is set.

In operation 14, $\theta-d\cdot f'(\theta)$ is defined as a new $\theta$.

In operation 15, $f(\theta)=I_sB_s+\alpha_eB_e$ is calculated. Here, $B_s=\{b_{s1}, b_{s2}, \ldots, b_{si}, \ldots, b_{sn}\}$, $I_s=\{a_{s1}, a_{s2}, \ldots, a_{si}, \ldots, a_{sn}\}$, $a_{si}=R(x1;\theta)\cdot b_{si}\cdot\cos<R(x1;\theta), b_{si}>$, $B_e=\{b_{e1}, b_{e2}, \ldots, b_{ei}, \ldots, b_{en}\}$, $\alpha_e=\{a_{e1}, a_{e2}, \ldots, a_{ei}, \ldots, a_{en}\}$, and $a_{ei}=R(x2;\theta)\cdot b_{ei}\cdot\cos<R(x2;\theta), b_{ei}>$ are satisfied.

In operation 16, $\|x1-f(\theta)\|$ is calculated.

In operation 17, it is verified whether $\|x1-f(\theta)\|-p1\leq g$ is satisfied. Here, in response to $\|x1-f(\theta)\|-p1\leq g$ being satisfied, $\alpha_1=\{a_{11}, a_{12}, \ldots, a_{1i}, \ldots, a_{1n}\}=\alpha_e$ and $\alpha_e=\{a_{e1}, a_{e2}, \ldots, a_{ei}, \ldots, a_{en}\}$ are satisfied, and $\theta$ indicates an angle value of rebuilt new coordinates.

In response to $\|x1-f(\theta)\|-p1>g$ being satisfied, $\|x1-f(\theta)\|=p1$ is set to return to operation 14.

Here, $\theta$ denotes a facial posture parameter, $f(\theta)$ denotes a column vector function of facial key point coordinates calculated based on a fitting coefficient, $f'(\theta)$ denotes a derived function of the column vector function $f(\theta)$, x1 denotes a column vector of the facial key point coordinates of the target facial expression image, $B_s$ denotes a pre-trained facial identification main component analyzing model, $I_s$ denotes a fitting coefficient of a facial identification main component analyzing model, $b_{si}$ denotes an i-th latitude element of the facial identification main component analyzing model, n denotes a model latitude degree, $a_{si}$ denotes an inner product of two vectors, $R(x1;\theta)$ denotes new coordinates obtained in response to the column vector x1 rotating based on the facial posture parameter $\theta$, $\cos<R(x1;\theta), b_{si}>$ denotes a cosine value of an angle between $R(x1;\theta)$ and $b_{si}$, $B_e$ denotes a pre-trained facial expression main component analyzing model, $\alpha_e$ denotes a fitting coefficient of a facial expression main component analyzing model, $b_{ei}$ denotes an i-th latitude element of the facial expression main component analyzing model, $a_{ei}$ denotes an inner product of two vectors, $\cos<R(x1;\theta), b_{ei}>$ denotes a cosine value of an angle between $R(x1;\theta)$ and $b_{ei}$, $\|x1-f(\theta)\|$ denotes a norm obtained by subtracting a column vector corresponding element of the column vector x1 and the column vector function $f(\theta)$, d denotes a preset control value, g denotes a preset value, and p1 denotes a norm corresponding to $\theta$.

The expression fitting result $\alpha_1$ may be acquired by fitting the facial key point coordinates of the target facial expression image.

The target image acquirer 340 may acquire an expression fitting result $\alpha_2$ by fitting the facial key point coordinates of the reference facial expression image based on the following operations.

In operation 21, a preset value $\theta$ is acquired.

In operation 22, $f(\theta)=I_sB_s+\alpha_eB_e$ is calculated. Here, $B_s=\{b_{s1}, b_{s2}, \ldots, b_{si}, \ldots, b_{sn}\}$, $I_s=\{a_{s1}, a_{s2}, \ldots, a_{si}, \ldots, a_{sn}\}$, $a_{si}=R(x2;\theta)\cdot b_{si}\cdot\cos<R(x2;\theta), b_{si}>$, $B_e=\{b_{e1}, b_{e2}, \ldots, b_{ei}, \ldots, b_{en}\}$, $\alpha_e=\{a_{e1}, a_{e2}, \ldots, a_{ei}, \ldots, a_{en}\}$, and $a_{ei}=R(x2;\theta)\cdot b_{ei}\cdot\cos<R(x2;\theta), b_{ei}>$ are satisfied.

In operation 23, $\min\|x2-f(\theta)\|$ is calculated and $\|x2-f(\theta)\|=p2$ is set.

In operation 24, $\theta-d\cdot f'(\theta)$ is defined as a new $\theta$.

In operation 25, $f(\theta)=I_sB_s+\alpha_eB_e$ is calculated. Here, $B_s=\{b_{s1}, b_{s2}, \ldots, b_{si}, \ldots, b_{sn}\}$, $I_s=\{a_{s1}, a_{s2}, \ldots, a_{si}, \ldots, a_{sn}\}$, $a_{si}=R(x2;\theta)\cdot b_{si}\cdot\cos<R(x2;\theta), b_{si}>$, $B_e=\{b_{e1}, b_{e2}, \ldots, b_{ei}, \ldots, b_{en}\}$, $\alpha_e=\{a_{e1}, a_{e2}, \ldots, a_{ei}, \ldots, a_{en}\}$, and $a_{ei}=R(x2;\theta)\cdot b_{ei}\cdot\cos<R(x2;\theta), b_{ei}>$ are satisfied.

In operation 26, $f(\theta)=I_sB_s+\alpha_eB_e$ is calculated.

In operation 27, it is verified whether $\|x2-f(\theta)\|-p2\leq g$ is satisfied.

Here, in response to $\|x2-f(\theta)\|-p2\leq g$ being satisfied, $\alpha_2=\{a_{21}, a_{22}, \ldots, a_{2i}, \ldots, a_{2n}\}=\alpha_e$ and $\alpha_e=\{a_{e1}, a_{e2}, \ldots, a_{ie}, \ldots, a_{en}\}$ are satisfied.

In response to $\|x2-f(\theta)\|-p2\leq g$ being satisfied, $\|x2-f(\theta)\|=p2$ is set to return to operation 24.

Here, $\theta$ denotes a facial posture parameter, $f(\theta)$ denotes a column vector function of facial key point coordinates calculated based on a fitting coefficient, $f'(\theta)$ denotes a derived function of the column vector function $f(\theta)$, x2 denotes a column vector of the facial key point coordinates of the target facial expression image, $B_s$ denotes a pre-trained facial identification main component analyzing model, $I_s$ denotes a fitting coefficient of a facial identification main component analyzing model, $b_{si}$ denotes an i-th latitude element of the facial identification main component analyzing model, n denotes a model latitude degree, $a_{si}$ denotes an inner product of two vectors, $R(x2;\theta)$ denotes new coordinates obtained in response to the column vector x2 rotating based on the facial posture parameter $\theta$, $\cos<R(x2;\theta), b_{ei}>$ denotes a cosine value of an angle between $R(x2;\theta)$ and $b_{si}$, $B_e$ denotes a pre-trained facial expression main component analyzing model, $\alpha_e$ denotes a fitting coefficient of a facial expression main component analyzing model, $b_{ei}$ denotes an i-th latitude element of the facial expression main component analyzing model, $a_{ei}$ denotes an inner product of two vectors, $\cos<R(x2;\theta), b_{ei}>$ denotes a cosine value of an angle between $R(x2;\theta)$ and $b_{ei}$, $\|x2-f(\theta)\|$ denotes a norm obtained by subtracting a column vector corresponding element of the column vector x2 and the column vector function $f(\theta)$, d denotes a preset control value, g denotes a preset value, and p2 denotes a norm corresponding to $\theta$.

The expression feature interpolator 320 may acquire a new expression feature $\alpha_3$ based on an interpolation value of the expression feature of the target facial expression image and the expression feature of the reference facial expression image using Equation 7, for example.

$$\alpha_3=c\alpha_1+(1-c)\alpha_2 \qquad \text{[Equation 7]}$$

In Equation 7, c denotes an interpolation value parameter, $0<C<1$ is satisfied, $\alpha_3$ denotes the new expression feature, $\alpha_1$ denotes the expression feature of the target facial expression image, and $\alpha_2$ denotes the expression feature of the reference facial expression image.

The expression image synthesizer 330 may rebuild new facial key point coordinates based on the new expression feature $\alpha_3$.

New facial key point coordinates $f(\theta')$ are as shown in Equation 8, for example.

$$f(\theta')=I_sB_s+\alpha_3B_e \qquad \text{[Equation 8]}$$

In Equation 8, $B_s=\{b_{s1}, b_{s2}, \ldots, b_{si}, \ldots, b_{sn}\}$, $I_s=\{a_{s1}, a_{s2}, \ldots, a_{si}, \ldots, a_{sn}\}$, $a_{si}=R(x1';\theta')\cdot b_{si}\cdot\cos<R(x1';\theta'), b_{si}>$, $B_e=\{b_{e1}, b_{e2}, \ldots, b_{ei}, \ldots, b_{en}\}$, $\alpha_3=\{a_{31}, a_{32}, \ldots, a_{3i}, \ldots, a_{3n}\}$, and $a_{3i}=R(x1'; \theta')\cdot b_{ei}\cdot\cos<R(x1'; \theta'),b_{ei}>$ are satisfied, and $\theta'$ indicates an angle value of rebuilt new coordinates.

A new facial expression image may be created by adjusting a pixel position of the target facial expression image based on a difference between the new facial key point coordinates and the facial key point coordinates of the target facial expression image.

Figure 12A:
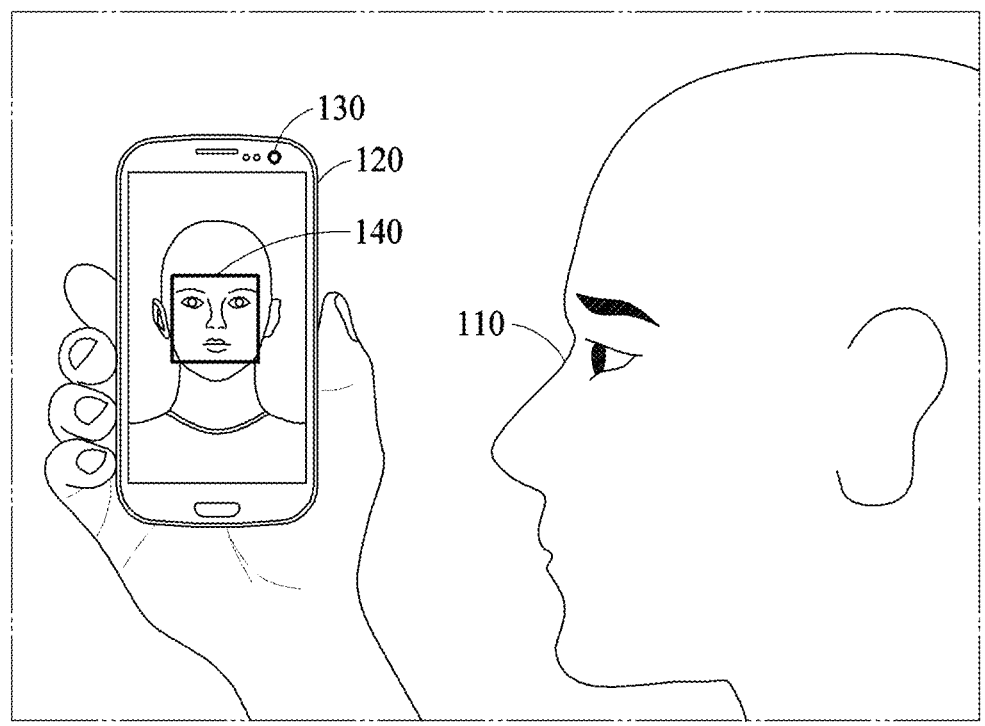
FIGS. 12A and 12B are diagrams illustrating examples of a computing apparatus to perform face verification.
Figure 12B:
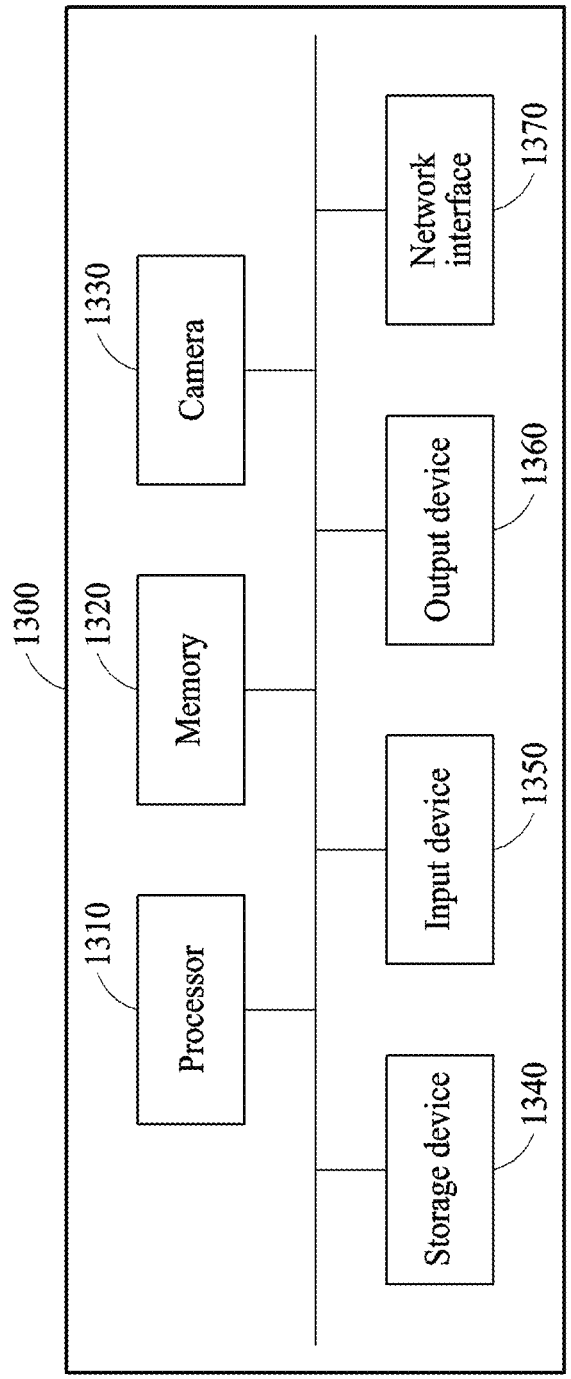

FIGS. 12A and 12B are diagrams illustrating examples of a computing apparatus.

Referring to FIGS. 12A and 12B, a face verification apparatus is included in, or represented by, a computing apparatus 120. The computing apparatus 120 is, for example, a smartphone, a wearable device, a tablet computer, a netbook, a laptop computer, a desktop computer, a personal digital assistant (PDA), a set-top box, home appliances, biometric locks, a security system, and a vehicle starting system.

Referring to FIG. 12A, the face verification apparatus performs a verification process of a face of a user 110 to determine whether to permit the user 110 to use a service or function available or performed by the computing apparatus 120, or to control an extent of use of such a service or function, or of another computing apparatus or server, for example. The face verification apparatus acquires an input image of the face of the user 110 captured using one or more cameras 130 included in the computing apparatus 120. The camera(s) 130 may be image acquiring devices, for example, a light sensor, digital still camera, and a video camera of the computing apparatus 120. The input image(s) may thus be image(s) that are input to the face verification apparatus, as a target of the face verification. An output of the X may be provided through display 140.

Referring to FIG. 12B, the computing apparatus 1300 performs a facial verification process by obtaining an image including a face of a user and comparing a feature extracted from the obtained image and a registered feature. The computing apparatus 1300 may correspond to the computing apparatus 320 illustrated in FIG. 12A, the image processing apparatus 300 illustrated in FIG. 10, as well as the expression feature interpolator 320 of FIG. 11, as non-limiting examples.

The computing apparatus 1200 includes a processor 1310, a memory 1320, a camera 1330, a storage device 1340, an input device 1350, an output device 1360, and a network interface 1370. The processor 1310, the memory 1320, the camera 1230, the storage device 1340, the input device 1350, the output device 1360, and the network interface 1370 may communicate with one another through a communication bus 1380.

The camera 1330 captures a still image, a video image, or both. The processor 1225 may control the camera 1230 to obtain or capture an image, e.g., including a face region, of a user by capturing an image for the face region of the user attempting at the facial verification, or may control the camera 1330 to autonomously capture images and automatically verify a user, for example, without user initiation. In addition, as noted above, the camera 1330 may also be controlled by the processor 1310 during other functions of the computing apparatus 1300, such as when operated as a personal camera. The camera 1330 may be representative of plural cameras, such as a color image/video camera and may further include a depth or infrared camera or time of flight (TOF) module, as only non-limiting examples.

The processor 1310 may implement functions and instructions to operate in the computing apparatus 1300 as described herein. For example, the processor 1325 may execute instructions stored in the memory 1220 or the storage device 1240. The processor 1310 may be the same one or more or all above discussed processors, as described above. The processor 1310 is configured to perform one or more, any combination, or all operations described with reference to FIGS. 1 through 12B. For example, the processor 1310 may be configured to perform registration and the facial verification by comparing the face image captured by the camera 1330 and the registered face image or corresponding registered features. In addition, the processor is configured to control other functions of the computing apparatus 1300. For example, the computing apparatus 1300 may be mobile device, such as a mobile phone, tablet, or personal computer, and thus the processor 1310 is further configured to implement other typical functions of the computing apparatus 1300. In an example, the processor 1310 may be configured to implement a lock-out operation to only permit a user to access or implement such other typical functions upon a successful verification of the user's captured face image, as discussed above.

The memory 1320 is a non-transitory computer readable media or device that stores information to be used for the facial verification. The memory 1320 may be the same one or more memories otherwise discussed herein, though examples are not limited thereto. The memory 1320 includes a computer-readable storage medium or a computer-readable storage device. In addition, memory 1320 is further representative of multiple such types of memory. The memory 1320 includes, for example, a RAM, a dynamic RAM (DRAM), a static RAM (SRAM), and other types of a nonvolatile memory well-known to the technical field to which the present disclosure pertains. The memory 1320 stores instructions to be implemented or executed by the processor 1310, and stores related information during software or an application being performed by the computing apparatus 1300.

The storage device 1340 includes a computer-readable storage medium or a computer-readable storage device. The storage device 1340 stores a database (DB) or matrix including registered features or registered images. In one example, the storage device 1340 stores a greater quantity of information compared to the memory 1320, and stores information for a relatively longer period of time. The storage device 1240 includes, for example, a magnetic disk drive, an optical disc, a redundant array of disks (RAID), a network attached storage (NAS), a flash memory, an erasable programmable read-only memory (EPROM), a floppy disk, or other types of nonvolatile memories well-known in the technical field to which the present disclosure pertains.

The input device 1350 receives an input from the user through a tactile, video, audio, or touch input. The input device 1350 includes one or more of, for example, a keyboard, a mouse, a touchscreen, a microphone, and other devices configured to detect the input from the user and transmit the detected input to the computing apparatus 1300.

The output device 1360 provides the user with an output of the computing apparatus 1300 through a visual, auditory, or tactile channel. For example, the output device 1360 visualizes information related to the facial verification and provides the user with the visualized information. For example, the visualized information may indicate whether the facial recognition was successful, or may enable access to further functions of the computing apparatus 1300 demonstrated through the visualized information. The output device 1360 includes one or more of, for example, a liquid crystal display (LCD), a light-emitting diode (LED) display, a touchscreen, a speaker, a vibration generator, and other devices configured to provide the output to the user. In one example, during the facial registration or verification respectively being performed, the computing apparatus 1300 displays or visually feeds backs the currently captured face image, or a preview image, obtained by the camera 1330 on a display screen to be viewed by the user, or another guide, or does not display the example face image, preview image, or other guide. The example face image or preview image may provide such visual feedback or encouragement to guide the user to provide the computing apparatus 1300 a full face image. The visual feedback may be a display of the currently captured image frames from which the input image is to be selectively captured for the facial recognition, or may provide the user with illustrated guidelines or overlays for a desirable or preferred positioning and size of the to-be captured image for facial recognition. Such face image or preview image may also not be provided, such as in the example where such facial verification is automatically performed, e.g., without user initiation.

The network interface 1370 communicates with an external device through a wired and/or wireless network. The network interface 1370 includes one or more of, for example, an Ethernet card, optical transceiver, a radio frequency transceiver, and other network interface cards configured to transmit and receive information. The network interface 1370 wirelessly communicates with the external device using a communication method, such as, for example, Bluetooth, WiFi, or a third generation (3G), fourth generation (4G), or fifth generation (5G) communication method. The network interface 1370 may further include a near field transceiver or the like. For example, through control of the processor 1310 upon verification of a user, the near field transceiver may transmit a payment authorization to an external terminal, such as with an appropriate mobile payment instruction transmitted by the near field transceiver. In addition, the processor 1310 may control the network interface 1370 to routinely check for updates for the registration and/or verification trained recognizer (or respective trained recognizer and verification portions) neural network(s), or other machine learning models, for example, and request, receive, and store parameters or coefficients of the same in the memory 1320 for use in the interpolation, recognition, and/or verification operations herein. For example, when the feature recognizers or extractors and face verifying is implemented though the above example trained neural network feature recognizers or extractors and/or trained face verifying networks, the processor 1310 may request, receive, and store updated trained weighting matrices for any or all of the recognizers or extractors and/or the face verifying neural network portions. In addition, updated hyper-parameters that can control or alter the configuration or architecture of such neural network(s) may also be requested, received, and stored along with corresponding trained weighting matrices in any of the memory 1320 or storage device 1340.

The facial expression image processing apparatus and components thereof, such as the expression feature acquirer 310, expression feature interpolator 320, expression image synthesizer 330, target image acquirer 340, parameter acquirer 321, interpolator 322 in FIGS. 1-11 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application such as deep learning machines, neural networks, and the like. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented method of processing a facial expression image, the method comprising:
   analyzing facial key point coordinates of at least two reference facial expression images;
   acquiring an expression feature by fitting the facial key point coordinates;
   generating a new expression feature based on an interpolation value of the expression feature; and
   adjusting a target facial expression image based on the new expression feature and creating a new facial expression image.

2. The method of claim 1, further comprising:
   setting one of the at least two reference facial expression images as the target facial expression image.

3. The method of claim 1, wherein the acquiring of the new expression feature comprises:
   acquiring an interpolation value parameter of the expression feature; and
   generating the new expression feature based on the interpolation value parameter.

4. The method of claim 3, wherein the acquiring of the interpolation value parameter comprises substantially randomly generating the interpolation value parameter.

5. The method of claim 3, wherein the generating of the new expression feature comprises generating the new expression feature based on the following equation:

$$\alpha_{n+1} = c_1\alpha_1 + c_2\alpha_2 + \ldots + c_i\alpha_i + \ldots + c_n\alpha_n$$

wherein $\alpha_{n+1}$ denotes a new expression feature, $c_i$ denotes an interpolation value parameter, $1 \leq i \leq n$, $0 < c_i < 1$, and $c_1 + c_2 + \ldots + c_i + \ldots + c_n = 1$ are satisfied, $\alpha_i$ denotes an expression feature of a reference expression image i, n denotes a number of reference expression images, and n is greater than or equal to 2.

6. A non-transitory computer readable storage medium storing instructions that, when executed by the processor, cause the processor to perform the method of claim 1.

7. A processor implemented method of processing a facial expression image, the method comprising:
   acquiring an expression feature of each of at least two reference facial expression images;
   setting one of the at least two reference facial expression images as a target facial expression image
   acquiring an expression feature of the target facial expression image;
   generating the new expression feature based on the expression feature of the target facial expression image and the expression feature of each of the at least two reference facial expression images;
   adjusting the target facial expression image based on the new expression feature and creating a new facial expression image.

8. A processor implemented method of processing a facial expression image, the method comprising:
   acquiring an expression feature of each of at least two reference facial expression images;
   generating a new expression feature based on an interpolation value of the expression feature; and
   adjusting a target facial expression image based on the new expression feature and creating a new facial expression image,
   wherein the expression feature of each of the at least two reference facial expression images is associated with an expression feature of a substantially identical type.

9. A processor implemented method of processing a facial expression image, the method comprising:

acquiring an expression feature of each of at least two reference facial expression images;

generating a new expression feature based on an interpolation value of the expression feature;

adjusting a target facial expression image based on the new expression feature and creating a new facial expression image;

actuating a camera to capture a facial expression image; and using the new facial expression image with the at least two reference facial expression images to train a neural network to recognize a facial expression in the captured facial expression image.

10. A processor implemented method of processing a facial expression image to train a facial recognition device, comprising:

analyzing facial key point coordinates of at least two reference facial expression images;

acquiring an expression feature by fitting the facial key point coordinates;

generating synthesized images, the synthesized images respectively based on adjusting a target facial expression image with new expression feature based on an interpolation value of the expression feature;

training a neural network with the synthesized images to recognize facial expressions;

recognizing a user's facial expression based on the trained neural network and an image of the user captured by a camera; and, interacting with the user based upon the recognized user's facial expression.

11. A facial expression image processing apparatus comprising:

a processor configured to acquire an expression feature of each of at least two reference facial expression images;

generate a new expression feature based on an interpolation value of the expression feature; and adjust a target facial expression image based on the new expression feature and create a new facial expression image, wherein the processor is further configured to analyze facial key point coordinates of the at least two reference facial expression images, to acquire an expression fitting results by fitting the facial key point coordinates, and to set the expression fitting results as the expression feature.

12. The apparatus of claim 11, the processor is further configured to:

set one of the at least two reference facial expression images as the target facial expression image.

13. The apparatus of claim 12, wherein the processor is further configured to acquire an expression feature of the target facial expression image and to generate the new expression feature based on the expression feature of the target facial expression image and the expression feature of each of the at least two reference facial expression images.

14. The apparatus of claim 11, wherein the processor is further configured to:

acquire an interpolation value parameter of the expression feature; and acquire the new expression feature based on the interpolation value parameter.

15. The apparatus of claim 14, wherein the processor is further configured to substantially randomly acquire the interpolation value parameter.

16. The apparatus of claim 14, wherein the processor is further configured to acquire the new expression feature based on the following equation:

$$\alpha_{n+1} = c_1\alpha_1 + c_2\alpha_2 + \ldots + c_i\alpha_i + \ldots + c_n\alpha_n$$

wherein $\alpha_{n+1}$ denotes a new expression feature, $c_i$ denotes an interpolation value parameter, $1 \leq i \leq n$, $0 < c_i < 1$, and $c_1 + c_2 + \ldots + c_i + \ldots + c_n = 1$ are satisfied, and $\alpha_i$ denotes an expression feature of a reference expression image i, n denotes a number of reference expression images, and n is greater than or equal to 2.

17. The apparatus of claim 11, wherein the expression feature of each of the at least two reference facial expression images is associated with an expression feature of a substantially identical type.

* * * * *